(12) United States Patent
Trias

(10) Patent No.: US 9,563,722 B2
(45) Date of Patent: Feb. 7, 2017

(54) SIGMA ALGEBRAIC APPROXIMANTS AS A DIAGNOSTIC TOOL IN POWER NETWORKS

(71) Applicant: Gridquant, Inc., Savannah, GA (US)

(72) Inventor: Antonio Trias, Barcelona (ES)

( * ) Notice: Subject to any disclaimer, the term of this patent is extended or adjusted under 35 U.S.C. 154(b) by 428 days.

(21) Appl. No.: 14/077,856

(22) Filed: Nov. 12, 2013

(65) Prior Publication Data

US 2014/0156094 A1 Jun. 5, 2014

Related U.S. Application Data

(60) Provisional application No. 61/725,684, filed on Nov. 13, 2012.

(51) Int. Cl.
| | |
|---|---|
| *G05B 13/04* | (2006.01) |
| *G06F 17/50* | (2006.01) |
| *G05B 23/02* | (2006.01) |
| *H02J 13/00* | (2006.01) |

(52) U.S. Cl.
CPC ........... *G06F 17/50* (2013.01); *G06F 17/5036* (2013.01); *G05B 23/0243* (2013.01); *G06F 2217/78* (2013.01); *H02J 13/0006* (2013.01); *Y02E 60/76* (2013.01); *Y04S 40/22* (2013.01)

(58) Field of Classification Search
CPC .. G06F 17/50; G06F 17/5036; G06F 2217/78; H02J 13/0006; G05B 23/0243; Y02E 60/76; Y04S 40/22
See application file for complete search history.

(56) References Cited

U.S. PATENT DOCUMENTS

| | | | |
|---|---|---|---|
| 3,886,330 | A | 5/1975 | Egelston et al. |
| 3,903,399 | A | 9/1975 | Enns et al. |
| 3,903,402 | A | 9/1975 | Petit et al. |
| 4,324,987 | A | 4/1982 | Sullivan, II et al. |
| 4,337,401 | A | 6/1982 | Olson |
| 4,464,724 | A | 8/1984 | Gurr et al. |
| 4,583,182 | A | 4/1986 | Breddan |
| 4,868,410 | A | 9/1989 | Nakamura |

(Continued)

OTHER PUBLICATIONS

A. Bultheel et al., Division Algorithms for Continued Fractions and the Pade Table:, J. Comp. Appld. Math. No. 6, 1980 pp. 259-266.

(Continued)

*Primary Examiner* — Ramesh Patel
(74) *Attorney, Agent, or Firm* — Gibb & Riley, LLC

(57) ABSTRACT

A system and method for constructively providing a set of complex-valued indices that measures the proximity of an electrical power distribution system to voltage collapse, and providing insights on general static stability issues in power networks. These indices, termed "sigmas", are designed through a mathematical osculation of the actual load flow solution with an equivalent two-bus system at every node. The procedure for obtaining these sigmas is based on the Holomorphic Embedded Load flow Method (HELM), and the indices are, in fact, proper analytical functions of the embedding parameter, which endows them with powerful diagnostic capabilities. These indices are then used graphically on a two-dimensional chart, in order to appreciate visually the overall distance of the system to voltage collapse, while at the same time spotting the weak nodes out of the whole grid, providing new situational awareness and diagnosis tools.

17 Claims, 7 Drawing Sheets

(56) References Cited

U.S. PATENT DOCUMENTS

| | | | |
|---|---|---|---|
| 4,974,140 A | 11/1990 | Iba et al. | |
| 5,181,026 A | 1/1993 | Granville | |
| 5,301,122 A | 4/1994 | Halpern | |
| 5,303,112 A | 4/1994 | Zulaski et al. | |
| 5,327,355 A | 7/1994 | Chiba et al. | |
| 5,414,640 A | 5/1995 | Seem | |
| 5,428,494 A | 6/1995 | Ahuja | |
| 5,442,335 A | 8/1995 | Cantin et al. | |
| 5,455,776 A | 10/1995 | Novosel | |
| 5,568,399 A | 10/1996 | Sumic | |
| 5,594,659 A | 1/1997 | Schlueter | |
| 5,610,834 A | 3/1997 | Schlueter | |
| 5,625,751 A | 4/1997 | Brandwajn et al. | |
| 5,629,862 A | 5/1997 | Brandwajn et al. | |
| 5,638,297 A | 6/1997 | Mansour et al. | |
| 5,642,000 A * | 6/1997 | Jean-Jumeau | H02J 3/1871 307/31 |
| 5,684,710 A | 11/1997 | Ehlers et al. | |
| 5,745,368 A | 4/1998 | Ejebe et al. | |
| 5,796,628 A * | 8/1998 | Chiang | H02J 3/14 307/29 |
| 5,973,899 A | 10/1999 | Williams et al. | |
| 6,058,355 A | 5/2000 | Ahmed et al. | |
| 6,061,609 A | 5/2000 | Kanoi et al. | |
| 6,141,634 A | 10/2000 | Flint et al. | |
| 6,185,482 B1 | 2/2001 | Egolf et al. | |
| 6,188,205 B1 | 2/2001 | Tanimoto et al. | |
| 6,198,403 B1 | 3/2001 | Dorrough et al. | |
| 6,202,041 B1 * | 3/2001 | Tse | H02J 3/00 702/58 |
| 6,212,049 B1 | 4/2001 | Spencer et al. | |
| 6,219,591 B1 | 4/2001 | Vu et al. | |
| 6,347,027 B1 | 2/2002 | Nelson et al. | |
| 6,486,569 B2 * | 11/2002 | Couture | H02G 7/00 219/501 |
| 6,496,757 B1 | 12/2002 | Flueck et al. | |
| 6,625,520 B1 | 9/2003 | Chen et al. | |
| 6,785,592 B1 * | 8/2004 | Smith | G06Q 50/06 700/291 |
| 6,904,372 B2 | 6/2005 | Fulczyk et al. | |
| 6,904,374 B2 | 6/2005 | Nachamkin | |
| 7,519,506 B2 | 4/2009 | Trias | |
| 7,769,497 B2 * | 8/2010 | Patel | H02J 3/06 307/20 |
| 7,816,927 B2 | 10/2010 | Li et al. | |
| 7,979,239 B2 | 7/2011 | Trias | |
| 8,121,741 B2 * | 2/2012 | Taft | G01D 4/004 340/3.1 |
| 8,315,742 B2 * | 11/2012 | Patel | H02J 3/00 700/286 |
| 8,634,965 B1 * | 1/2014 | Gou | H02J 13/0006 700/286 |
| 8,648,499 B2 * | 2/2014 | Krok | H02J 3/18 307/103 |
| 8,751,421 B2 * | 6/2014 | Anderson | G05B 23/0229 706/12 |
| 8,816,531 B2 * | 8/2014 | Krok | H02J 3/1807 307/31 |
| 2001/0040446 A1 | 11/2001 | Lapinksi et al. | |
| 2003/0040846 A1 * | 2/2003 | Rehtanz | H02J 3/24 700/292 |
| 2003/0160457 A1 | 8/2003 | Ragwitz et al. | |
| 2006/0047370 A1 | 3/2006 | Chu et al. | |
| 2006/0229767 A1 | 10/2006 | Chu et al. | |

OTHER PUBLICATIONS

Geroge A. Baker et al., Pade Approximants, Second Edition:, Encyclopedia of Mathematics and its Applications, vol. 59 (Cambridge University Press, 1966) pp. 495-507.

Salam et al., "Parallel processing for the load flow of power systems: the approach and applications", Proceedings of the 28th IEEE Conference on Decision and Control, Dec. 13-15, 1989 pp. 2173-2178.

Guo et al., "The real homotopy-based method for computing solutions of electric power systems", IEEE International Symposium on Circuits and Systems, 1992, vol. 6, May 3-6, 1992 pp. 2737-2740.

Guo et al., "The homotopy continuation method to approach voltage collapse of electric power systems", IEEE International Symposium on Circuits and Systems, 1993, vol. 4, May 3-6, 1993 pp. 2644-2647.

Iba et al., "Calculation of critical loading condition with nose curve using homotopy continuation method", IEEE Transactions on Power Systems, vol. 6, Issue 2, May 1991 pp. 584-593.

Hwang et al., "Solution of General Pade Fitting Problem Via Continued-Fraction Expansion", IEEE Transactions on Automatic Control, vol. 32, Issue 1, Jan. 1987 pp. 57-59.

Okumura et al., "A computation of power system characteristic by general homotopy and investigation of its stability", IEEE International Symposium on Circuits and Systems, 1992, vol. 6, May 3-6, 1992 pp. 2745-2748.

Culot et al., "A quasi-Newton algorithm for first-order saddle-point location", Theoretical Chemistry Accounts: Theory, Computation, and Modeling, vol. 82, Nos. 3-4 / May 1992 pp. 189-205.

Shah et al., "An Algorithm for Simulating Power/Ground Networks using Pade Approximants and its Symbolic Implementation", IEEE Transactions on Circuits and Systems II: Analog and Digital Signal Processing, vol. 45, Issue 10, Oct. 1998 pp. 1372-1382.

Numerical Recipes, "5.2 Evaluation of Continued Fractions", Cambridge University Press, 1988-1992, www.library.cornell.edu/nr/cbookcpdf.html.

Liao, "Numerically solving non-linear problems by the homotopy analysis method", Computations Mechanics 20 (1997), pp. 530-540.

Wikipedia, "Holomorphic function" (Dec. 13, 2005) "Taylor series" (Dec. 24, 1005), http://en.wikipedia.org.

Tolikas et al., "Homotopy methods for solving decoupled power flow equations", IEEE International Symposium on Circuits and Systems, 1992, vol. 6, May 3-6, 1992 pp. 2833-2839.

Zhigang et al., "A new method to calculate multiple power flow solutions" 2000 International Conference on Advances in Power System Control, Operation and Management, vol. 2, Oct. 30-Nov. 1, 2000 pp. 491-495.

Freeman, "Electric utilities say goodbye to good enough", Nov. 21, 2002. http://uaelp.pennnet.com/Articles/Article_Display.cfm?Section=ONART&Subsection=Display&ARTICLE_ID=162054&KEYWORD=elequant.

* cited by examiner

SIGMA ALGEBRAIC APPROXIMANTS AS A DIAGNOSTIC TOOL IN POWER NETWORKS

CROSS REFERENCE TO RELATED APPLICATIONS

The present application claims the benefit under 35 U.S.C. §120 as a non-provisional of presently pending U.S. Patent Application Ser. No. 61/725,684 entitled "SIGMA ALGEBRAIC APPROXIMANTS AS A DIAGNOSTIC TOOL IN POWER NETWORKS", filed on Nov. 13, 2012, the entire teachings of which are incorporated herein by reference.

BACKGROUND

Systems and methods herein generally relate to the problem of voltage collapse in the context of static stability of power networks in electric utilities, and more particularly to methods for both off-line analysis and real-time monitoring of the proximity of the system to voltage collapse.

Such methods provide measures of the distance to voltage collapse, either qualitatively or quantitatively, through numerical indicators or graphical tools, in order to enable a quick diagnostic on the static stability of the network. Some methods, such as the ones disclosed herein, also provide ways to identify the particular nodes in the network that are more directly involved in the stability problems, which is of great importance when managing very large networks.

The present disclosure is framed under the general field of static stability in Electrical Power Distribution Systems. This field includes, but is not limited to, static voltage stability. The Holomorphic Embedding Load-flow Method (HELM) described in U.S. Pat. Nos. 7,519,506 and 7,979,239 provides a solution under the form of an algebraic curve enabling the study of these general static stability aspects. The most thoroughly studied problem in this field is that of voltage stability.

The problems related to voltage stability in power systems are one of the major concerns in planning and operation of large electrical power network grids. As defined by the Institute of Electrical and Electronics Engineers (IEEE) and the Council on Large Electric Systems (CIGRE), voltage stability refers to the ability of a power system to maintain steady voltages at all buses in the system after being subjected to a disturbance from a given initial operating condition. Although voltage instability may be originated by local phenomena, its consequences may have widespread impact. A typical outcome of voltage instability is loss of load in an area, or tripping of transmission lines and other elements by their protections leading to cascading outages that in turn may lead to loss of synchronism of some generators. The term "voltage collapse" is also often used: voltage collapse is the process by which the sequence of events accompanying voltage instability leads to a partial or extensive blackout in the network. Due to economical and environmental constraints, power networks have become more complex and heavily loaded. Voltage instability is then an increasingly serious problem, as utilities are pushed to operate the system closer to its limits.

According to the time frame characterizing the phenomenon of voltage stability, the IEEE/CIGRE considers short-term and long-term problems. While short-term voltage stability studies need dynamic modeling of loads (it is similar in this respect to rotor angle stability), long-term voltage stability can be assessed through several static analysis techniques. The methods disclosed herein fall within this second class of methods. In general, these techniques are based on the steady state of the system, the so-called load flow equations. The pragmatic goal is to estimate stability margins (distance to collapse), as well as identify weak nodes (those whose voltage variations are highly sensitive to further variations of load or generation in the system) in the system or other factors influencing stability.

Many static techniques have been developed to provide an estimation of the proximity to collapse. The classical technique is the use of P-V/Q-V curves, which provide a measure of the load margins. Other methods take into account the structure of the load flow problem and attempt to measure the distance to the closest bifurcation, since voltage collapse takes place when the stable load flow solution merges with an unstable one. The V/V0 index system relies on comparing the original load flow case with one in which all the loads are set to zero, in order to spot the weaker nodes. Most other systems rely on approximating the power system via the use of a local model, normally a two-bus system that can be solved exactly in closed form.

SUMMARY

The method disclosed herein comprises a procedure for calculating a set of complex-valued indices which, when plotted in a specific two-dimensional chart, provide a graphical measure of the proximity of the state of the electrical distribution system to voltage collapse and provide insights on general static stability issues in power networks. These indices, hereafter termed "sigma", are designed through a mathematical osculation of the actual load flow solution using an equivalent two-bus system at every node, and then obtained with the techniques of the Holomorphic Embedded Load-flow Method (HELM), as described in U.S. Pat. Nos. 7,519,506 and 7,979,239, the entire teachings of which are incorporated herein by reference, in their entirety. The osculation is a local non-linear Thévenin equivalent at each node. Therefore, these indices are meant to be calculated for each particular electrical state, and, in fact, their computation takes about the same amount of work as a load flow calculation. The resulting sigma values, one for each electrical node, are complex-valued indicators that measure the proximity to voltage collapse by their distance to the limit parabola $\sigma_I^2 - \sigma_R - 1/4 = 0$ on the complex $\sigma$-plane. Points inside the parabola correspond to a stable solution, while points outside signal the condition of collapse (no solution). Moreover, their graphical representation on a two-dimensional chart allows not only assessment of the overall proximity to collapse of the state of the whole network, but also easily highlights the particular nodes in the system that are responsible for such problem.

The innovation is inspired in the reduced dimensionless model for a two-bus system, in which the parameters of the line impedance ($Z=R+jX$), and the complex power injection representing the load ($S=P+jQ$), become represented by just one complex parameter sigma ($\sigma = \sigma_R + j\sigma_I$). For a two-bus system, the values of $\sigma$ determine whether or not there exists a load flow solution: the condition is that $1/4 + \sigma_R - \sigma_I^2 > 0$. This condition can be expressed graphically as requiring that the $\sigma$ parameter is located inside the parabola shown in FIG. 2. The parabola itself marks the boundary where the system reaches voltage collapse. For a system with N electrical nodes, one can analogously define a parameter $\sigma$ in the same way, one for each node ($\sigma_n$). The idea is to osculate the load flow solution locally at each node by using the two-bus mode with dimensionless parameters.

According to systems and methods herein, the automated procedure for obtaining these sigma indices may be based on the Holomorphic Embedded Load-flow Method (HELM). The indices are, in fact, proper analytical functions of the embedding parameter, which endows them with powerful diagnostic capabilities. These indices are then used graphically on a two-dimensional chart, in order to appreciate visually the overall distance of the system to voltage collapse, while at the same time spotting the weak nodes out of the entire network. This capability provides quick assessment of static stability, in real time, which is essential as a situational awareness tool. Additionally, and in contrast to other methods, it is possible to analyze the system when it is under the condition of collapse (i.e., no load flow solution), since the holomorphic embedding allows tracing of the evolution of the sigma indices for values of the embedding parameter ranging from zero to the point where collapse is met. This capability offers great diagnostic powers in the analysis of large network models.

According to a computer-implemented method herein, a first mathematical model of load flow equations (L) representing an electric power system having an electrical grid in which all voltages are equal to a normal or designed voltage level and there is no energy flow in links of the electrical grid is generated using a computerized device. The first mathematical model comprises a holomorphic embedding of the load flow equations as (L(s)). The variable s comprises a variable in a complex domain that includes a value s=0 corresponding to a no load case (L(0)) in which all voltages are equal to a normal or designed voltage level and there is no energy flow in links of the electrical grid, and each variable of the load flow equations (L) is contained in L(s) as a function of the variable s by the holomorphic embedding. The first mathematical model of the load flow equations (L), with the holomorphic embedding, is transformed to a second mathematical model comprising a dimensionless equivalent grid model for each node of the electrical grid, using the computerized device. The second mathematical model comprises the holomorphic embedding of s in the load flow equations (L(s)) according to a sigma index function. The sigma index function comprises a σ function of s in a complex domain. The first mathematical model and the second mathematical model are transcribed into software for use in a computer processor adapted to execute the software. Analytical continuation is used in the computer processor to perform mathematical osculation of the load flow equations at each the node of the electrical grid to calculate voltage at each the node of the electrical grid.

A system herein comprises a supervisory control and data acquisition system collecting data from an electrical grid of an electric power system. The electrical grid has a plurality of nodes. The data is indicative of electrical conditions in the electrical grid. The system includes a processor-controlled energy management system in communication with the supervisory control and data acquisition system. The processor-controlled energy management system further comprises a program of instructions executable by the energy management system to process the data received from the supervisory control and data acquisition system into load flow equations (L) representing the electrical grid. A first mathematical model of the load flow equations (L) is generated. The first mathematical model comprises a holomorphic embedding of the load flow equations as (L(s)). The variable s comprises a variable in a complex domain that includes a value s=0 corresponding to a no load case (L(0)) in which all voltages are equal to a normal or designed voltage level and there is no energy flow in links of the electrical grid, and each variable of the load flow equations (L) is contained in L(s) as a function of the variable s by the holomorphic embedding. The first mathematical model of the load flow equations (L), with the holomorphic embedding, is transformed to a second mathematical model comprising a dimensionless equivalent grid model for each node of the electrical grid. The second mathematical model comprises a holomorphic embedding of s in the load flow equations (L(s)) according to a sigma index. The sigma index comprises a variable σ in a complex domain.

According to another computer-implemented method herein, a first mathematical model of an electrical power network having an electrical grid with a plurality of nodes is generated using a topology comprising a dimensionless, two-bus equivalent model at each node of the electrical grid, using a computerized device. The model contains only a complex voltage of each node and a complex parameter, sigma, at each node. Load flow equations (L) representing the first mathematical model are embedded in a holomorphic embedding as (L(s)), using the computerized device. The variable s is a variable in a complex domain that includes a value s=0 corresponding to a no load case (L(0)) in which the complex voltage is equal to a normal or designed voltage level and there is no energy flow in links of the electrical grid and a value s=1 corresponding to an objective case (L(1)) representative of the electrical grid in a condition for which stability is to be determined. Each variable of the load flow equations (L) is contained in L(s) as a function of the variable s by the holomorphic embedding. The first mathematical model of the load flow equations (L) with the holomorphic embedding is transformed to a second mathematical model comprising a dimensionless equivalent grid model for each node of the electrical grid, using the computerized device. The second mathematical model comprises a holomorphic embedding of s in the load flow equations (L(s)) according to the complex parameter, sigma, at each the node. The first mathematical model and the second mathematical model are transcribed into software for use in a computer processor adapted to execute the software. Values of unknowns in parameters of the holomorphic embedding (L(s)) are developed in power series, using the computer processor. The values are in a neighborhood of the value for the no load case of each parameter of the load flow equations. The computer processor is used to compute an n-order algebraic approximant to the power series. Data is received from connectivity points of the electrical grid, using the computerized device. Analytical continuation is used in the computer processor to perform mathematical osculation of the load flow equations at each node of the electrical grid to calculate the complex voltage at each node and the complex parameter, sigma, at each node. A representation of the complex parameter, sigma, is displayed for a node of the electrical grid as a measure of proximity to voltage collapse in the electrical power network, using the computerized device.

DETAILED DESCRIPTION

Systems and methods herein employ some of the techniques for holomorphic embedding described in U.S. Pat. Nos. 7,519,506 and 7,979,239, the entire teachings of which are incorporated herein by reference, in their entirety.

To illustrate the well-known fact of the ill condition of the existing state of the art methodology in the vicinity of voltage collapse, a very simple example of a very small network with final quadratic load flow equations can be used (exact solutions are easily computed).

The electrical power network is represented through the electrical grid model by means of an accurate representation of all of its components: bus bars, lines, transformers, loads, generators, DC couplings, shunts, etc. These elements are modeled using a set of values defining its state (voltage, angle, and active and reactive power for nodal elements and complex flows for link elements). These values are not independent. They must satisfy the Ohm and Kirchov Laws, which for these variables become a system of non-linear equations due to the presence of elements specified as constant power (mainly loads and generators).

This system of equations, well known as the Load Flow or Power Flow equations, can or cannot have a solution (Voltage Collapse) and the mathematical solution to this problem normally is multiple, with a degree of multiplicity as high as $2^N$ where N is the number of buses in the network. From this set of $2^N$ solutions, only one corresponds to the physical situation. The rest of the solutions are spurious and cannot represent the physical solution of a real power system. A standard approach to this highly nonlinear problem has been the use of numerical approximation methods of an iterative nature.

Figure 1:
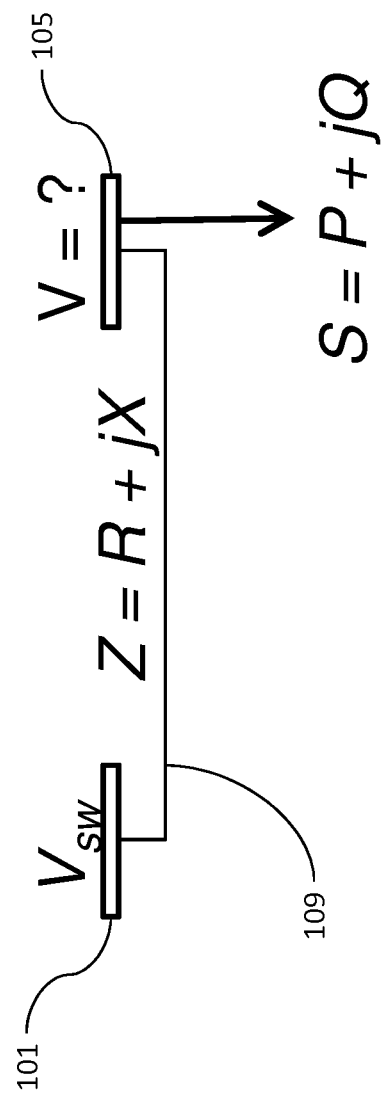
FIG. 1 is a representation of a two-bus network.

Referring to FIG. 1, the general load flow problem has at least one swing bus 101 and a set of nodes (generation nodes and/or load nodes). In the very simple minimalist example chosen, we will only have one node comprising a load bus 105, as well as the swing bus 101. The swing bus 101 does not vary its voltage value no matter how the load and topology may vary in the rest of the network. The swing bus 101 acts as a large generator or substation capable of providing any power required by the system. Only active power and reactive power are calculated at the swing bus, balancing the sum of both at the rest of the nodes.

An alternating current in a stationary regime satisfies Ohm's law with complex values. This is the origin of the complex values (X is the inductance, V is the voltage, and R is the reactance) used in this problem.

Ohm's Law for this simple system is simply:

$$V - V_{sw} = ZI$$

where $V_{sw}$ is the initial voltage, I is the complex intensity, and Z is the impedance. The trivial solution is $$V = V_{sw} + ZI.$$

Since $V_{sw}$ and Z are known, if the intensity I consumed at the load node is given, the complex V value is easily computed (singular Z=0 is a short circuit, which is excluded).

In the example shown in FIG. 1, the circuit has only two nodes or buses: the swing bus 101 with complex voltage fixed at $V_{sw}=1$, i.e., $|V_{sw}|$ is 1, and its angle or phase is 0. The other node is a load bus 105, and the goal is to calculate the value of the complex voltage: module and phase equivalent to real and imaginary parts.

The network has only one transmission line 109 joining both the swing bus 101 and the load bus 105 with an impedance:

$$Z = R + jX$$

(j is a complex unit, R is Reactance, and X is inductance).

In general, I, the intensity is not known (not easily measurable values in high and medium voltage nodes), which could reduce the load flow problem to a linear one easily solved by matrix inversion. Only loads are known at complex power values, that is P: Active power and Q: Reactive power, the first value being the object to be billed, and easily measured at the transformer level.

Let S be the complex power:

$$S = P + jQ.$$

The relation among these is:

$$S = VI^*,$$

where * stands for the complex conjugate. Therefore, Ohm's Law becomes:

$$V = V_{sw} + ZS^*/V^*.$$

This, unfortunately, is the quadratic and non-linear equation that has to be solved for larger N: number of nodes. This is the real difficult problem of Load Flow calculation.

Using the two-bus electrical grid model shown in FIG. 1, we have one swing bus 101 with voltage $V_{sw}$, a transmission line 109 modeled by a series impedance $Z=R+jX$, and a PQ load bus 105 with a constant-power injection $S=P+jQ$. The equations herein use the usual convention of signs for injections, that is, power being injected into a node is positive (therefore, an actual load has negative values of P). The load flow equations of the system become:

$$\frac{V - V_{sw}}{Z} = \frac{S^*}{V^*}$$

where V is the unknown, the complex voltage at the load bus. Rearranging the equation and dividing by $V_{sw}$ obtains:

$$\frac{V}{V_{sw}} = 1 + \frac{ZS^*}{\|V_{sw}\|^2} \frac{V^*}{V_{sw}^*}$$

Defining $U \equiv V/V_{sw}$ and $\sigma \equiv ZS^*/\|V_{sw}\|^2$, the following equation is obtained in terms of dimensionless variables:

$$U = 1 + \frac{\sigma}{U^*}$$

It is straightforward to solve this algebraic equation with one complex variable U. The two solutions are:

$$U = \frac{1}{2} \pm \sqrt{\frac{1}{4} + \sigma_R - \sigma_I^2} + j\sigma_I$$

Figure 2:
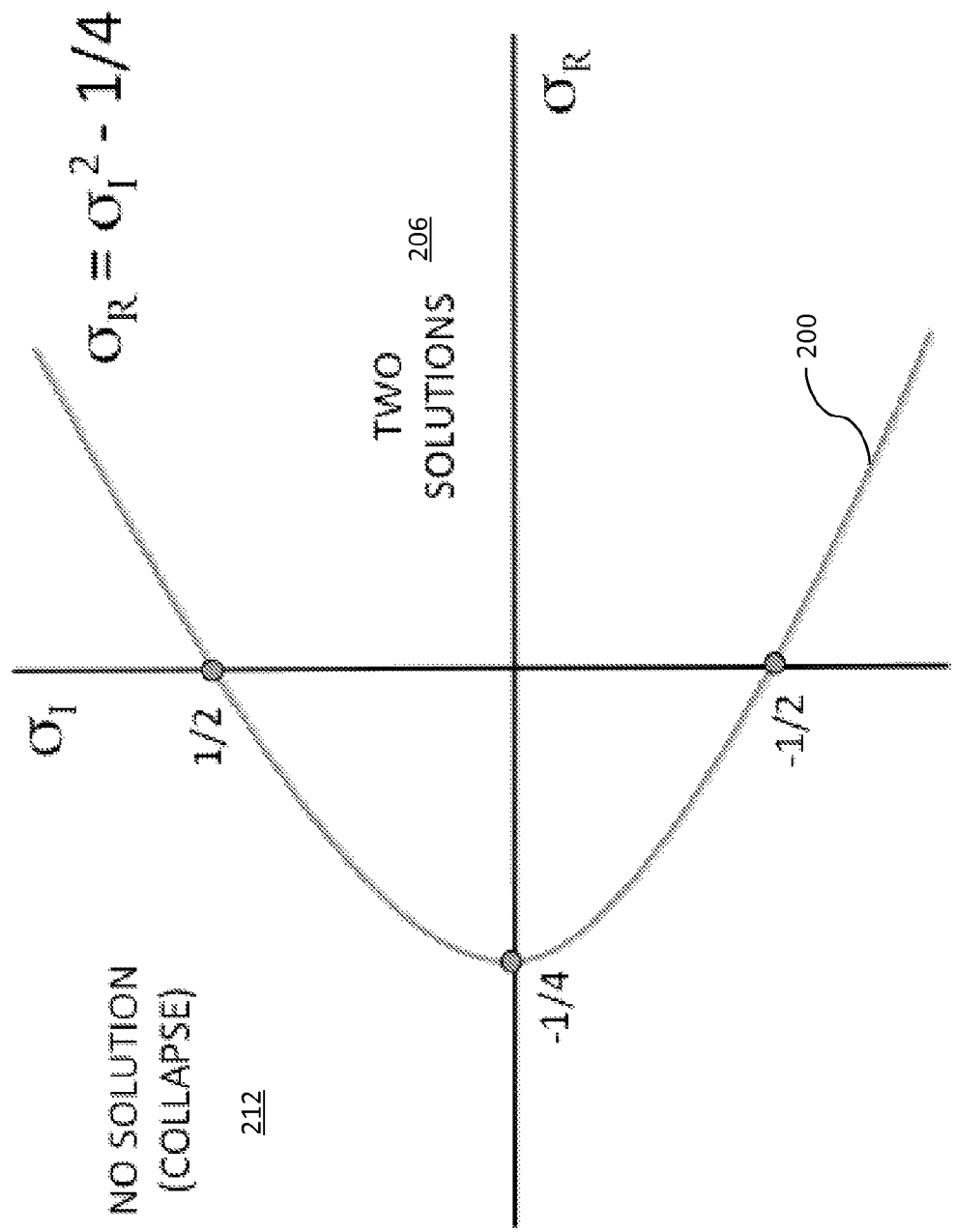
FIG. 2 shows a graph of a σ-plane according to systems and methods herein.

As is well known, the solution with the plus sign corresponds to the correct operative solution, while the other one corresponds to an unstable state in most well designed power systems. The two solutions meet at the locus of points where the radicand becomes zero, which is given by the parabola $$\frac{1}{4} + \sigma_R - \sigma_I^2 = 0,$$

indicated as 200 in the complex σ-plane, shown in FIG. 2. This marks the boundary with the voltage-collapsed region. For values of σ outside of this parabola 200, that is, $$\sigma_R < \sigma_I^2 - \frac{1}{4},$$

there is no load flow solution.

FIG. 2 shows the region in the σ-plane (the area, indicated as 206, inside the parabola 200) where the two-bus model has two solutions (one stable solution and one unstable solution) versus the region in the σ-plane (the area, indicated as 212, outside the parabola 200) where the system has no solution and therefore is under the condition of voltage collapse. The parabola 200 is the boundary for voltage collapse: points on the parabola 200 correspond to the limit where the stable and unstable solutions coalesce in a saddle-node bifurcation.

According to the present disclosure, the disclosed method thus proceeds to apply these ideas to a full N-bus network, using the framework of the Holomorphic Embedding method. For an n-bus case, let $Y_{ij}$ be the admittance matrix of an n-buses network (0 is a swing bus), with $S_i$ and $V_i$ being the complex power and complex voltage at bus i. The load flow equations can be written as:

$$\sum_j Y_{ij} V_j + Y_i^{sh} V_i = \frac{S_i^*}{V_i^*}$$

where $V_i$ are the node voltages, $Y_{ij}$ are the elements of the transmission admittance matrix, $Y_i^{sh}$ are the shunt admittances, and $S_i$ are the constant-power injections in the system.

In order to solve the load flow equation, we define an holomorphic embedding in a family of problems depending on a complex parameter s such that we know the solution for s=0 (no load case), and for s=1 we recover the original equations.

As the embedding is designed to define the voltages as holomorphic functions, the knowledge of their power series expansion around a single value of s determines, in a unique way, the values of the voltage for all possible values of s in the domain of the function. Notice that in this case, knowledge of the power series expansion around one point is equivalent to knowledge of the full function for all s values. The holomorphic equation permits this because a holomorphic function is defined as a complex function on complex variables and is complex-differentiable at every point. This is different from methodologies related to a homotopy continuation method, restricted to a real parameter, in which it is necessary to follow a path in a predictor-corrector way by using only first order derivatives (not the full power series expansion).

One of the possible holomorphic embedding is:

$$\sum_j Y_{ij} V_j(s) + s Y_i^{sh} V_i(s) = \frac{s S_i^*}{V_i^*(s^*)}$$

Next, a functional transform is defined from the analytical functions to the infinite sequences set:

$$\tau : f(s) \to f[n] = \frac{1}{n!} \left[ \frac{\partial^n f(s)}{\partial s^n} \right]_{s=0}$$

where f[n] is the n-th coefficient of the MacLaurin series expansion of f(s) around s=0.

$$f(s) = f[0] + f[1]s + f[2]s^2 + \ldots + f[n]s^n + \ldots$$

with the properties $$\tau(f(s)) = f[n]$$
$$\tau(1) = \delta_{n0}$$
$$\tau(s) = \delta_{n1}$$
$$\tau(sf(s)) = f[n-1]$$
$$\tau(f(s)g(s)) = (f*g)[n] = \sum_{k=0}^{n} f[k]g[n-k]$$

Rewrite the original equation as $$\sum_j Y_{ij} V_j(s) + s Y_i^{sh} V_i(s) = s S_i^* W_i^*(s)$$

$$W_i(s) \equiv \frac{1}{V_i(s^*)}$$

Applying the transform to both sides of the equation, obtains $$\sum_j Y_{ij} V_j[n] + Y_i^{sh} V_i[n-1] = S_i^* W_i^*[n-1]$$

defining a recurrence over n taking into account that $$W_i(s)V_i(s) = 1 \Rightarrow (W_i^* V_i^*)[n] = \delta_{n0}$$
$$W_i[0] = \frac{1}{V_i[0]} = 1$$
$$W_i[n] = 1 - \sum_{k=0}^{n-1} W_i[k] V_i[n-k]$$

\* being the sequence convolutions operator.

The steps to calculate the coefficients in the series expansion to order n are i) Initialization $$V_i[0]=W_i[0]=1$$

ii) For m=1 to n
Calculate Vi[m] solving the linear system.
Calculate Wi[m].

Figure 3:
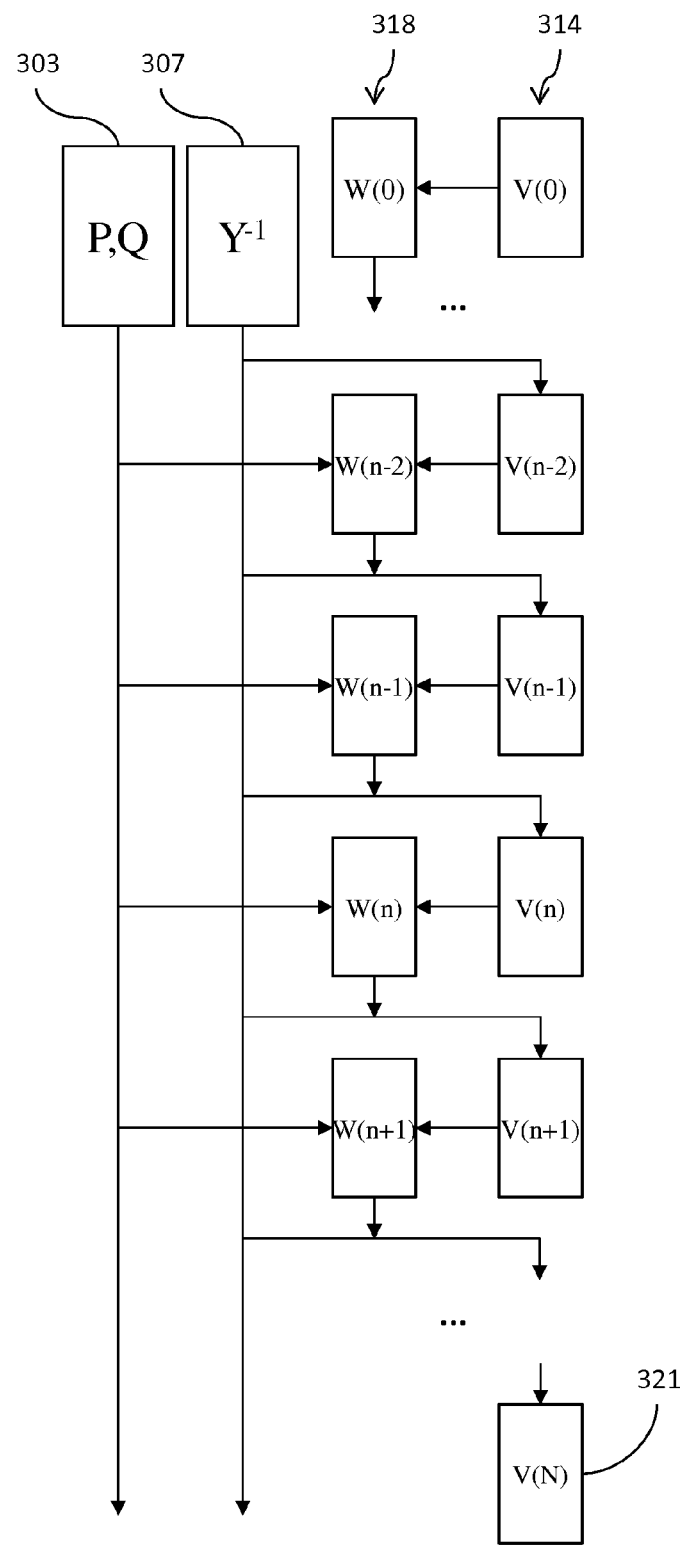
FIG. 3 is a schematic representation of a method for determining power series coefficients for voltages V[n].

The process is represented in FIG. 3 in which P, Q 303 represents power; P is active power and Q is reactive power; $Y^{-1}$ 307 represents admittance; V( ) 314 represents voltage; and W( ) 318 represents the calculation in the series. V(N) 321 is the calculated solution voltage.

This will give the power series expansion of Vi(s) up to order N. In general, however, this series will not converge for s=1. Nevertheless, a continued fraction expansion of the power series will converge for all s values when voltages are given inside the solution set continuously connected to the s=0 case (no load).

Next, from the series coefficients, it is possible to build an n-order algebraic approximant as the preferred procedure for performing analytic continuation from the point s=0 to s=1. By Stalh's Theorem, the analytic continuation using Padé Approximants is guaranteed to have convergence on a maximal domain. Therefore, if the Padé Approximants converge at s=1, then there exists a solution; and if they oscillate at s=1, then there is no solution.

The power flow solution would consist in all voltages V, calculated at s=1 by means of an analytic continuation procedure, such as by using Padé approximants, but here, the power series is used in order to define a new set of functions.

According to systems and methods herein, the (complex valued) sigma index $\sigma_I$ at node i may be defined as the holomorphic function of s given by the following sigma index function:

$$V_i(s) = 1 + \frac{s\sigma_i(s)}{V_i^*(s^*)}$$

which mimics the equation for the two-bus model in dimensionless magnitudes, as shown above. In a certain heuristic sense, this can be thought of as a local, nonlinear Thévenin equivalent, but in dimensionless parameters. Using the sigma index function, all indices for the entire network can be plotted on just one two-dimensional chart representing the σ-plane.

Figure 4:
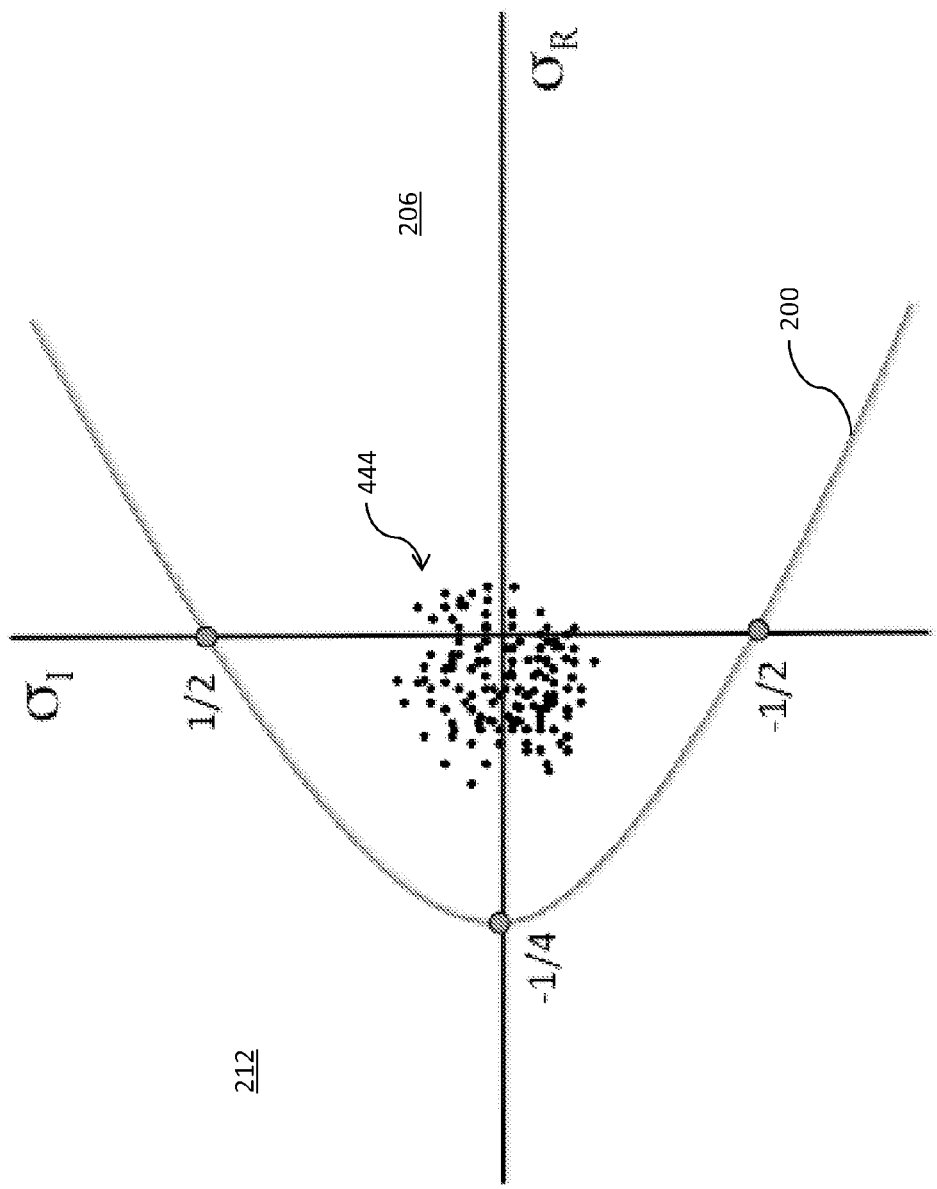
FIG. 4 shows a sigma plot for a general N-nodes network, under a normal state according to systems and methods herein.

The actual computation of the sigma indices proceeds using straightforward mathematical techniques in the field of analytic continuation. FIG. 4 shows a plot of sigma indices on a complex sigma-plane for a general N-nodes network, under a normal state. In the example shown in FIG. 4, all the sigma indices 444 are located well inside the parabola 200. In this case, the sigma indices 444 can be computed via the Padé approximants to the quotient of two formal power series, for which there exist very efficient algorithms. Therefore, the sigma indices 444 are more properly termed sigma algebraic approximants, which reminds us of their true character: they are holomorphic functions of the embedding parameter. Note also that, by their very definition, the sigma indices 444 have this intrinsic algebraic property: if the system has a solution for the voltages, then the sigma indices 444 are all inside the parabola 200 (or at the very boundary), and vice-versa. This is because, if there were any sigma index out of the parabola 200, it would be geometrically impossible to have a corresponding value for the voltage satisfying the above definition.

Figure 5:
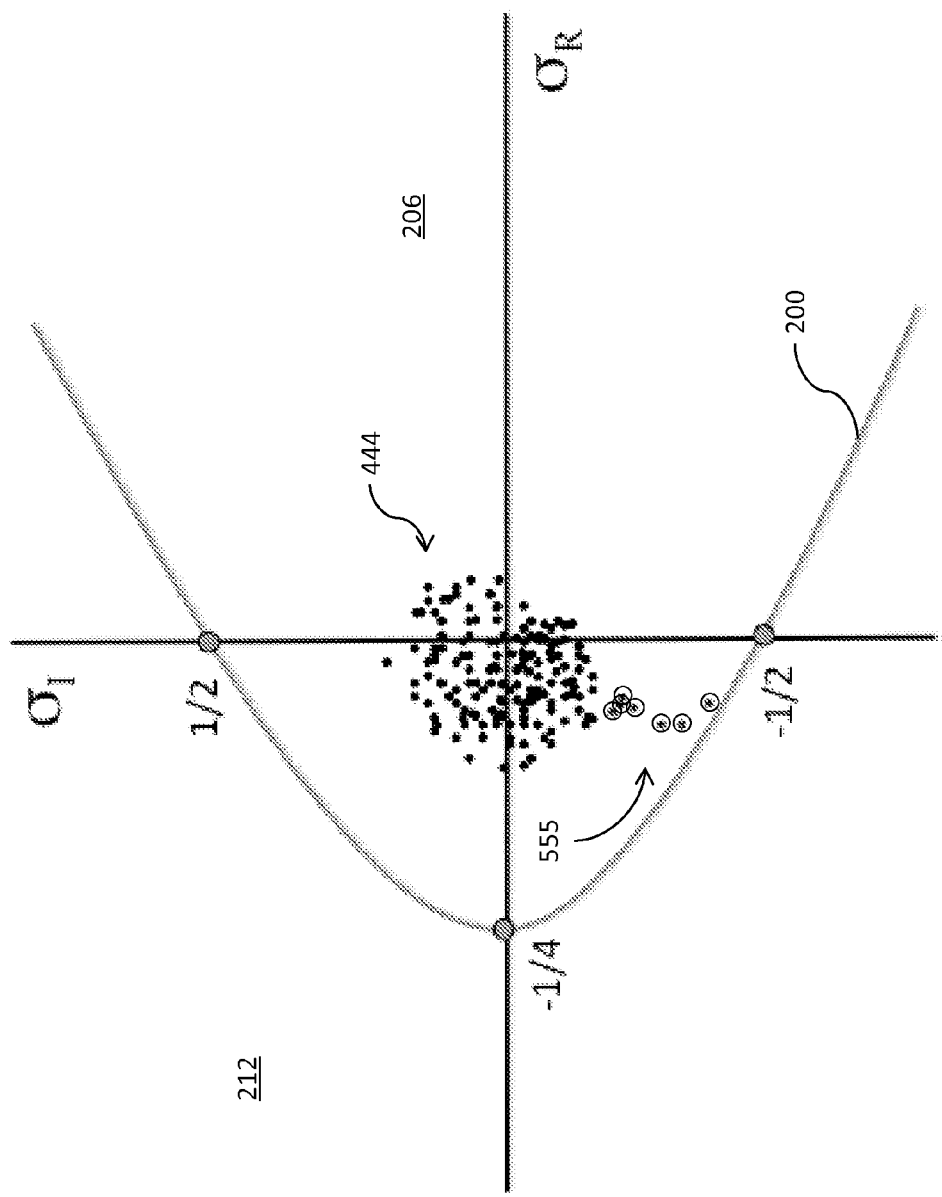
FIG. 5 shows a sigma plot for a general N-nodes network, under a degraded state according to systems and methods herein.

FIG. 5 shows a sigma plot for a general N-nodes network, under a state in which a few nodes (represented by highlighted sigma indices 555) are clearly deviating from the main cluster of sigma indices 444 and approaching the boundary of parabola 200. As shown in FIG. 5, the system is approaching voltage collapse.

The power of the sigma indices for quick diagnostics and for spotting weak nodes in large networks becomes evident in comparing FIGS. 4 and 5. FIG. 4 shows a sigma plot for an electrical grid model under normal grid operation conditions. All sigma indices 444 are more or less clustered around a cloud that sits well inside the critical parabola in the complex sigma-plane. FIG. 5, by contrast, shows a state of the network where there exists risk of stability problems, as a few nodes (represented by highlighted sigma indices 555) have values of sigma that are approaching the parabola 200. It is immediate to visually appreciate that there exist problems. Moreover, it is quite easy to identify the nodes (represented by highlighted sigma indices 555) that are involved in the problem. As shown in FIG. 5, according to systems and methods herein, nodes within a predetermined distance to the parabola 200 can be highlighted.

Cases in which the system is under collapse can also be dealt with, thanks to the use of the embedding parameter. Recall that the actual load flow solution is obtained for s=1, when there exists a solution. When there is no solution, the power series can still be analytically continued for values of s that range from 0 up to some limiting value (less than 1). It is possible, therefore, to plot the evolution of the sigma indices as the parameter s is varied, and the sigma plot will uncover how one or more nodes become involved in the problem, as their sigma indices approach the limit of parabola 200. Additionally, since HELM methodology is able to model the problem for every complex value of s, it is possible to obtain information for general static behavior. This has been confirmed empirically for general values of s outside the feasibility region where the values for sigma indices are still well defined. This allows us to qualitatively measure how far the system is into the collapse region, which is not possible with any other method known up to now.

The patterns formed by the cloud of sigma indices, as shown in FIGS. 4 and 5, also have value for diagnostics and assessment. Typical electrical scenarios produce a graphical pattern that can be easily learned and recognized by electrical engineers as corresponding to "normal grid scenarios". This allows the engineers to recognize abnormal situations quickly, simply by detecting an unusual graphical pattern, which may allow the engineer to infer additional information that has not been available up to now. Such additional information might enrich the engineer's knowledge of the grid.

Described herein is method of measuring proximity to voltage collapse in an electric power system having an electrical grid model which may be employed in a number of aspects for general management of the electrical grid, including observation and estimation of the network state, voltage stability, and contingency analysis, limit controls, and system restoration following a voltage collapse. It is contemplated that other applications may likewise utilize the above-described method, particularly including: the generation of dynamic restoration plans as a path search method; generalized OPF as a path search method and limit controls as a boundary case; improved methods for generating PV and QV curves indirectly through substitution of available load flow techniques by the above-described method; determination of voltage collapse region characteristics using zeroes and poles of the approximants; and voltage stability analysis and contingency analysis through substitution of available load flow techniques by the above-described method.

Figure 6:
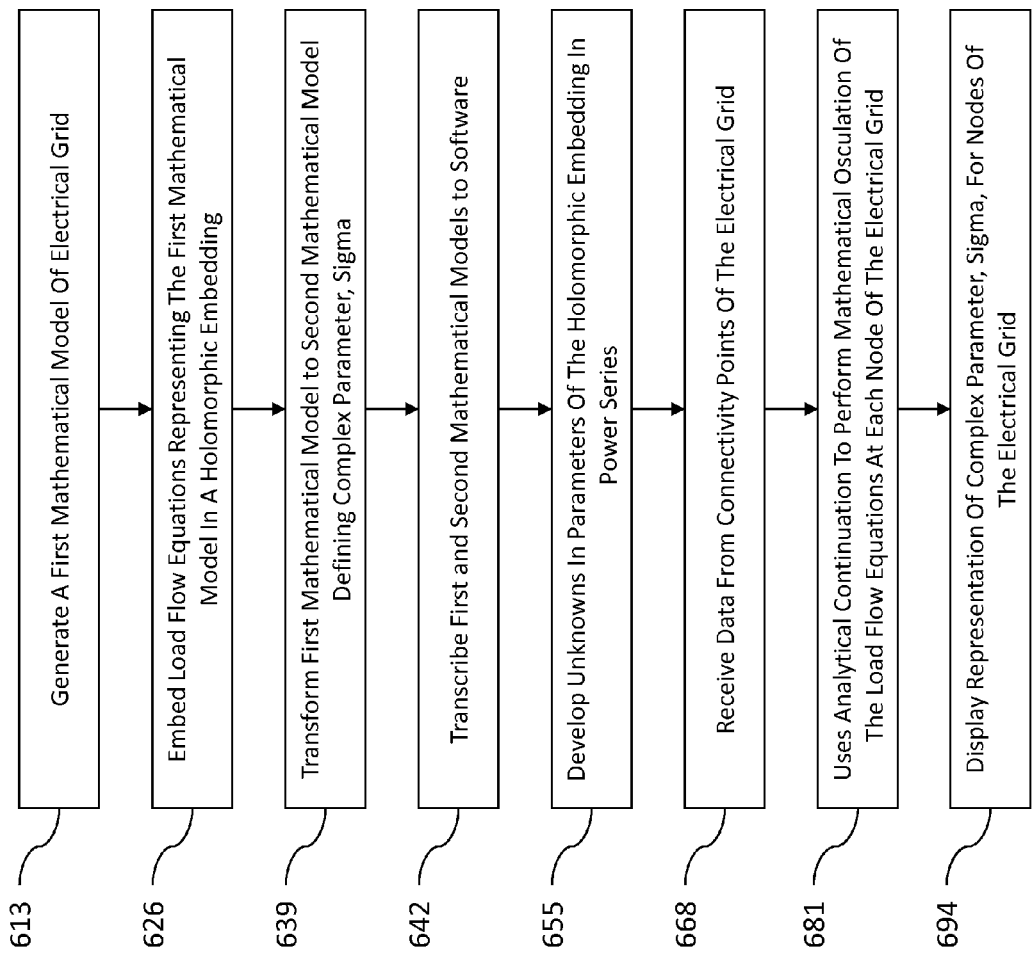
FIG. 6 is a flow diagram illustrating systems and methods herein.

FIG. 6 is a flow diagram illustrating the processing flow of an exemplary computer-implemented method of assessing and diagnosing static stability problems in an electrical power network having an electrical grid having a plurality of nodes according to systems and methods herein. In item 613, a first mathematical model of the load flow equations for an electrical power network is generated using a topology comprising a dimensionless, two-bus equivalent model at each node of the electrical grid. The first model contains only a complex voltage of each node and a complex parameter, sigma, at each node. At 626, load flow equations (L) representing the first mathematical model are embedded in a holomorphic embedding (L(s)) where s is a variable in a complex domain that includes a value s=0 corresponding to a no load case (L(0)). When s=0, the complex voltage is equal to a normal or designed voltage level and there is no energy flow in links of the electrical grid. s=1 corresponds to an objective case (L(1)) representative of the electrical grid in a condition for which stability is to be determined. Each variable of the load flow equations (L) is contained in L(s) as a function of the complex variable s by the holomorphic embedding. At 639, the first mathematical model of the load flow equations (L), with the holomorphic embedding, is transformed to a second mathematical model comprising a dimensionless equivalent grid model for each node of the electrical grid. The second mathematical model comprises a holomorphic embedding of s in the equations (L(s)) defining the complex parameter, sigma, at each node. The first mathematical model and the second mathematical model are transcribed into software for use in a computer processor adapted to execute the software, at 642. Values of unknowns in parameters of the holomorphic embedding (L(s)) are developed in power series, using the computer processor, at 655. The values of s are in a neighborhood of the value for the no load case of each parameter of the load flow equations. The computer processor is used to compute an n-order algebraic approximant to the power series. Data is received from the connectivity points of the electrical grid, at 668. At 681, the computer processor uses analytical continuation to perform mathematical osculation of the load flow equations at each node of the electrical grid in order to calculate the complex voltage at each node and the complex parameter, sigma, at each node. A representation of the complex parameter, sigma, is displayed for the nodes of the electrical grid as a measure of proximity to voltage collapse in the electrical power network, at 694.

The topology of the actual representation can vary if the model is only detailed up to bus bar level, which may suit off-line studies for Planning Engineers. Yet, for operations, the model must reach switching levels. Real time instruments in the field measure some of these parameters, such as voltage, phase angle, and line temperatures in the power lines, which are sent through communication lines to centralized control centers. As would be known to one of skill in the art, a data acquisition system connected to the electric power network provides data representative of the conditions of the network grid. SCADA (Supervisory and Data Acquisition) Systems are the basic hardware-software basis for observation and operation of a power system network (alarms, Automatic Generation Control or "AGC," etc.), and EMSs (Energy Management Systems) include more advanced software applications that implement the process of information transformation within such control centers calculating load flow, optimal power flow, contingency analysis, etc. Data coming from the field may include loads generations, voltages, flows, and the state of breakers, among others. The network topology describes the possible connectivity of the electrical network.

Figure 7:
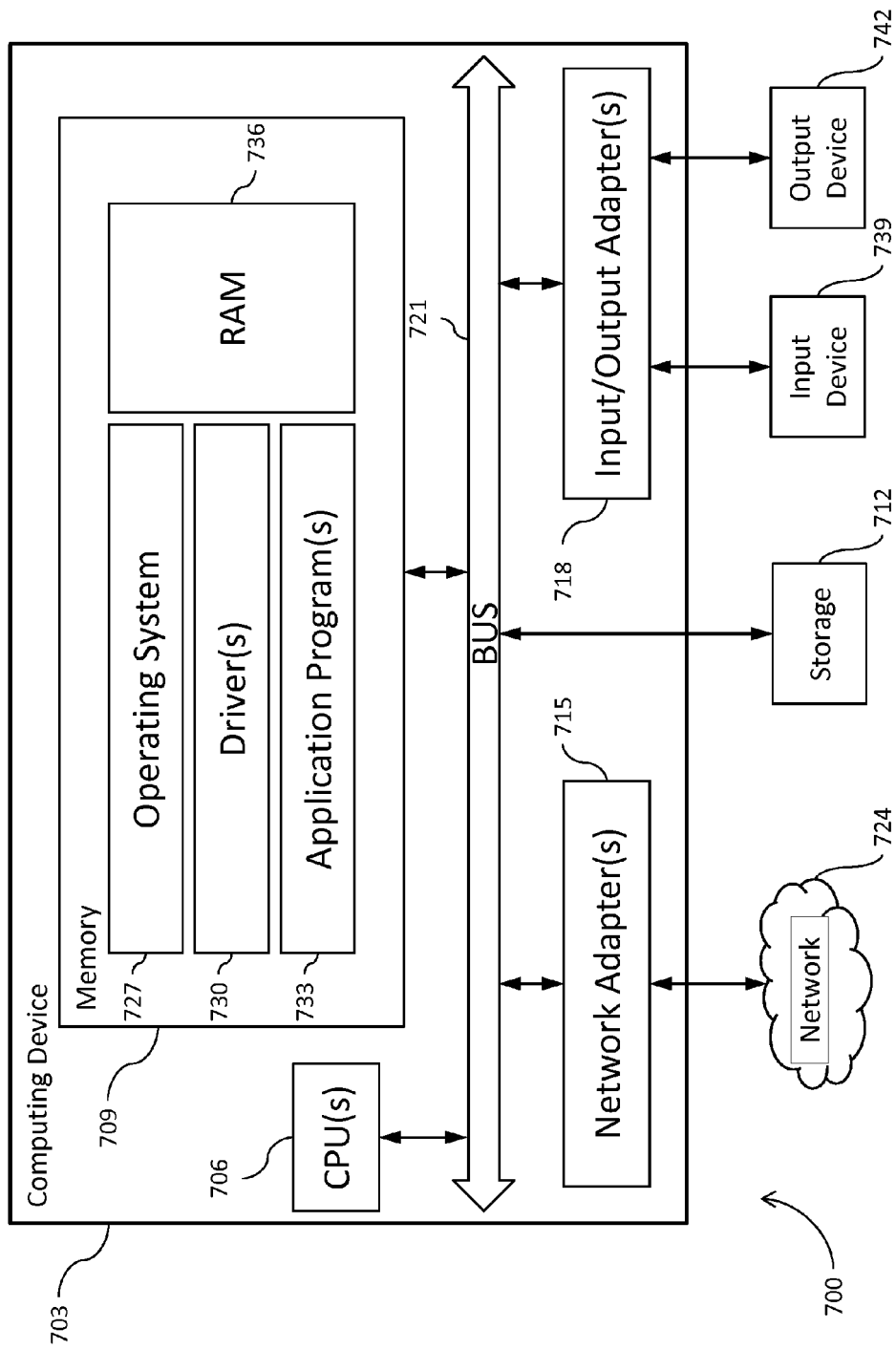
FIG. 7 is a schematic diagram of a hardware system according to systems and methods herein.

A representative hardware environment for practicing the systems and methods described herein is depicted in FIG. 7. This schematic drawing illustrates a hardware configuration of an information handling/computing system 700 in accordance with systems and methods herein. The computing system 700 comprises a computing device 703 having at least one processor or central processing unit (CPU) 706, internal memory 709, storage 712, one or more network adapters 715, and one or more input/output adapters 718. A system bus 721 connects the CPU 706 to various devices such as the internal memory 709, which may comprise random access memory (RAM) and/or read-only memory (ROM), the storage 712, which may comprise magnetic disk drives, optical disk drives, a tape drive, etc., the one or more network adapters 715, and the one or more input/output adapters 718. Various structures and/or buffers (not shown) may reside in the internal memory 709 or may be located in a storage unit separate from the internal memory 709.

The one or more network adapters 715 may include a network interface card such as a LAN card, a modem, or the like to connect the system bus 721 to a network 724, such as the Internet. The network 724 may comprise a data processing network. The one or more network adapters 715 perform communication processing via the network 724.

The internal memory 709 stores an appropriate Operating System 727, and may include one or more drivers 730 (e.g., storage drivers or network drivers). The internal memory 709 may also store one or more application programs 733 and include a section of Random Access Memory (RAM) 736. The Operating System 727 controls transmitting and retrieving packets from remote computing devices (e.g., host computers, storage systems, SCADA, etc.) over the network 724. In some systems and methods, the Supervisory and Data Acquisition Systems and/or Energy Management Systems may connect to the computing system 700 over the network 724. The drivers 730 execute in the internal memory 709 and may include specific commands for the network adapter 715 to communicate over the network 724. Each network adapter 715 or driver 730 may implement logic to process packets, such as a transport protocol layer to process the content of messages included in the packets that are wrapped in a transport layer, such as Transmission Control Protocol (TCP) and/or Internet Protocol (IP).

The storage 712 may comprise an internal storage device or an attached or network accessible storage. Storage 712 may include disk units and tape drives, or other program storage devices that are readable by the system. A removable medium, such as a magnetic disk, an optical disk, a magneto-optical disk, a semiconductor memory, or the like, may be installed on the storage 712, as necessary, so that a computer program read therefrom may be installed into the internal memory 709, as necessary. Programs in the storage 712 may be loaded into the internal memory 709 and executed by the CPU 706. The Operating System 727 can read the instructions on the program storage devices and follow these instructions to execute the methodology herein.

The input/output adapter 718 can connect to peripheral devices, such as input device 739 to provide user input to the CPU 706. The input device 739 may include a keyboard, mouse, pen-stylus, microphone, touch sensitive display screen, or any other suitable user interface mechanism to gather user input. An output device 742 can also be connected to the input/output adapter 718, and is capable of rendering information transferred from the CPU 706, or other component. The output device 742 may include a display monitor (such as a Cathode Ray Tube (CRT), a Liquid Crystal Display (LCD), or the like), printer, speaker, etc.

The computing system 700 may comprise any suitable computing device 703, such as a mainframe, server, personal computer, workstation, laptop, handheld computer, telephony device, network appliance, virtualization device, storage controller, etc. Any suitable CPU 706 and Operating System 727 may be used. Application Programs 733 and data in the internal memory 709 may be swapped into storage 712 as part of memory management operations.

It is expected that any person skilled in the art can implement the disclosed procedure using a computer program. The computer program may include instructions that would be provided to a processor of a general purpose computer, special purpose computer, or other programmable data processing apparatus to produce a machine, such that the instructions that execute via the processor of the computer or other programmable data processing apparatus obtain and plot different sets of sigma indices for a given network model under various realizations of the load, generation, and other parameters. The generalization of the example charts shown above to any other graphical representation of these indices should be evident to any person skilled in the art.

As will be appreciated by one skilled in the art, aspects of the systems and methods herein may be embodied as a system, method, or computer program product. Accordingly, aspects of the present disclosure may take the form of an entirely hardware system, an entirely software system (including firmware, resident software, micro-code, etc.) or an system combining software and hardware aspects that may all generally be referred to herein as a "circuit," "module", or "system." Furthermore, aspects of the present disclosure may take the form of a computer program product embodied in one or more computer readable medium(s) having computer readable program code embodied thereon.

Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a Read-Only Memory (ROM), an Erasable Programmable Read-Only Memory (EPROM or Flash memory), an optical fiber, a magnetic storage device, a portable compact disc Read-Only Memory (CD-ROM), an optical storage device, a "plug-and-play" memory device, like a USB flash drive, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the Figures illustrate the architecture, functionality, and operation of possible implementations of systems, methods, and computer program products according to various systems and methods herein. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular systems and methods only and is not intended to be limiting of this disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

While particular values, relationships, materials, and steps have been set forth for purposes of describing concepts of the systems and methods herein, it will be appreciated by persons skilled in the art that numerous variations and/or modifications may be made to the systems and methods as shown in the disclosure without departing from the spirit or scope of the basic concepts and operating principles of the concepts as broadly described. It should be recognized that, in the light of the above teachings, those skilled in the art could modify those specifics without departing from the concepts taught herein. Having now fully set forth certain systems and methods, and modifications of the concepts underlying them, various other systems and methods, as well as potential variations and modifications of the systems and methods shown and described herein will obviously occur to those skilled in the art upon becoming familiar with such underlying concept. It is intended to include all such modifications and alternatives insofar as they come within the scope of the appended claims or equivalents thereof. It should be understood, therefore, that the concepts disclosed might be practiced otherwise than as specifically set forth herein. Consequently, the present systems and methods are to be considered in all respects as illustrative and not restrictive.

The concepts herein have been described with references to specific systems and methods. While particular values, relationships, materials and steps have been set forth for purposes of describing such concepts, it will be appreciated by persons skilled in the art that numerous variations and/or modifications may be made to the systems and methods as shown in the disclosure without departing from the spirit or scope of the basic concepts and operating principles as broadly described. It should be recognized that, in the light of the above teachings, those skilled in the art could modify those specifics without departing from the concepts taught herein. Having now fully set forth certain systems and methods, and modifications of the concepts underlying them, various other systems and methods, as well as potential variations and modifications of the systems and methods shown and described herein, will obviously occur to those skilled in the art upon becoming familiar with such underlying concept. It is intended to include all such modifications and alternatives insofar as they come within the scope of the appended claims or equivalents thereof. It should be understood, therefore, that the concepts disclosed might be practiced otherwise than as specifically set forth herein. Consequently, the present systems and methods are to be considered in all respects as illustrative and not restrictive.

What is claimed is:

1. A computer-implemented method of evaluating the state of an electrical grid, comprising:
    generating a first mathematical model of load flow equations (L) representing an electric power system having an electrical grid in which all voltages are equal to a normal or designed voltage level and there is no energy flow in links of said electrical grid, using a computerized device,
        said first mathematical model comprising a holomorphic embedding of said load flow equations as (L(s)), s comprising a variable in a complex domain that includes a value s=0 corresponding to a no load case (L(0)) in which all voltages are equal to a normal or designed voltage level and there is no energy flow in links of said electrical grid, and each variable of said load flow equations (L) is contained in L(s) as a function of said variable s by said holomorphic embedding;
    transforming said first mathematical model of said load flow equations (L), with said holomorphic embedding, to a second mathematical model comprising a dimensionless equivalent grid model for each node of said electrical grid, using said computerized device,
        said second mathematical model comprising said holomorphic embedding of s in said load flow equations (L(s)) according to a sigma index function, said sigma index function comprising a σ function of s in a complex domain;
    transcribing said first mathematical model and said second mathematical model into software for use in a computer processor adapted to execute said software;
    using analytical continuation in said computer processor to perform mathematical osculation of said load flow equations at each said node of said electrical grid to calculate voltage at each said node of said electrical grid; and
    diagnosing an electrical state of said electrical grid by analyzing evolution of s in said sigma index function on a two-dimensional sigma plane using functional dependency of said sigma index function on said holomorphic embedding parameters, using said computerized device.

2. The computer-implemented method of claim 1, further comprising:
    displaying a representation of said sigma index for a node of said electrical grid as a measure of proximity to voltage collapse in said electric power system, using said computerized device.

3. The computer-implemented method according to claim 2, said measure of proximity to voltage collapse being quantified as a distance of said sigma index to a parabola $$\sigma_I^2 - \sigma_R - \frac{1}{4} = 0$$

on a complex sigma-plane.

4. The computer-implemented method of claim 2, further comprising:
    highlighting a representation of said sigma index for a node of said electrical grid within a predetermined distance to a parabola $$\sigma_I^2 - \sigma_R - \frac{1}{4} = 0$$

on a complex sigma-plane, using said computerized device.

5. The computer-implemented method of claim 4, further comprising:
    determining proximity to voltage collapse of said electric power system based on said representation of said sigma index on said complex sigma-plane, using said computerized device.

6. The computer-implemented method of claim 1, further comprising:
    receiving data from a supervisory and data acquisition system representative of conditions of said electrical grid, using said computerized device; and
    calculating voltage at each said node of said electrical grid from said data, using said computerized device.

7. A system for evaluating the state of an electrical grid, comprising:
    a supervisory control and data acquisition system collecting data from an electrical grid of an electric power system, said electrical grid having a plurality of nodes, said data being indicative of electrical conditions in said electrical grid, and a processor-controlled energy management system in communication with said supervisory control and data acquisition system, said processor-controlled energy management system further comprising a program of instructions executable by said energy management system to:

process said data received from said supervisory control and data acquisition system into load flow equations (L) representing said electrical grid;

generate a first mathematical model of said load flow equations (L), said first mathematical model comprising a holomorphic embedding of said load flow equations as (L(s)), s comprising a variable in a complex domain that includes a value s=0 corresponding to a no load case (L(0)) in which all voltages are equal to a normal or designed voltage level and there is no energy flow in links of said electrical grid, and each variable of said load flow equations (L) is contained in L(s) as a function of said variable s by said holomorphic embedding;

transform said first mathematical model of said load flow equations (L), with said holomorphic embedding, to a second mathematical model comprising a dimensionless equivalent grid model for each node of said electrical grid, said second mathematical model comprising a holomorphic embedding of s in said load flow equations (L(s)) according to a sigma index, said sigma index comprising a variable σ in a complex domain;

use analytical continuation to perform mathematical osculation of said load flow equations at each said node of said electrical grid to calculate σ at each said node of said electrical grid;

diagnose an electrical state of said electrical grid by analyzing evolution of said variable σ in a complex domain on a two-dimensional sigma plane using functional dependency of said variable σ on said holomorphic embedding parameters; and display a representation of said sigma index for a node of said electrical grid as a measure of proximity to voltage collapse in said electric power system.

8. The system according to claim 7, said measure of proximity to voltage collapse being quantified as a distance of said sigma index to a parabola $$\sigma_I^2 - \sigma_R - \frac{1}{4} = 0$$

on a complex sigma-plane.

9. The system according to claim 7, said processor-controlled energy management system further comprising executable computer instructions to:

highlight a representation of said sigma index for a node of said electrical grid within a predetermined distance to a parabola $$\sigma_I^2 - \sigma_R - \frac{1}{4} = 0$$

on a complex sigma-plane.

10. A computer-implemented method of evaluating the state of an electrical grid, comprising:

generating a first mathematical model of an electrical power network having an electrical grid with a plurality of nodes using a topology comprising a dimensionless, two-bus equivalent model at each node of said electrical grid, using a computerized device, said model containing only a complex voltage of each said node and a complex parameter, sigma, at each said node;

embedding load flow equations (L) representing said first mathematical model in a holomorphic embedding as (L(s)), using said computerized device, s being a variable in a complex domain that includes a value s=0 corresponding to a no load case (L(0)) in which said complex voltage is equal to a normal or designed voltage level and there is no energy flow in links of said electrical grid and a value s=1 corresponding to an objective case (L(1)) representative of said electrical grid in a condition for which stability is to be determined, each variable of said load flow equations (L) being contained in L(s) as a function of said variable s by said holomorphic embedding;

transforming said first mathematical model of said load flow equations (L) with said holomorphic embedding, to a second mathematical model comprising a dimensionless equivalent grid model for each node of said electrical grid, using said computerized device, said second mathematical model comprising a holomorphic embedding of s in said load flow equations (L(s)) according to said complex parameter, sigma, at each said node;

transcribing said first mathematical model and said second mathematical model into software for use in a computer processor adapted to execute said software;

developing in power series, values of unknowns in parameters of said holomorphic embedding (L(s)), using said computer processor, said values being in a neighborhood of said value for said no load case of each parameter of said load flow equations;

using said computer processor to compute an n-order algebraic approximant to said power series;

receiving data from connectivity points of said electrical grid, using said computerized device;

using analytical continuation in said computer processor to perform mathematical osculation of said load flow equations at each said node of said electrical grid to calculate said complex voltage at each said node and said complex parameter, sigma, at each said node;

displaying a representation of said complex parameter, sigma, for a node of said electrical grid as a measure of proximity to voltage collapse in said electrical power network, using said computerized device; and diagnosing an electrical state of said electrical grid by analyzing evolution of said complex parameter, sigma, on a two-dimensional sigma plane using functional dependency of said complex parameter, sigma, on said holomorphic embedding parameters, using said computerized device.

11. The computer-implemented method of claim 10, further comprising:

after said receiving data from said connectivity points of said electrical grid, testing said data in order to make inferences on any missing information and quality of available measurements, using said computerized device.

12. The computer-implemented method according to claim 11, said testing of said data including logical considerations concerning said connectivity points and said data received from said connectivity points of said electrical grid.

13. The computer-implemented method according to claim 10, said receiving data from said connectivity points of said electrical grid comprising receiving data from a supervisory and data acquisition system representative of conditions of said electrical grid, and forming said load flow equations (L) from said data.

14. The computer-implemented method according to claim 10, said data comprising loads, generations, voltages, flows, and states of circuit breakers.

15. The computer-implemented method according to claim 10, said measure of proximity to voltage collapse being quantified as a distance of said complex parameter, sigma, to a parabola $\sigma_I^2 - \sigma_R - 1/4 = 0$ on a complex sigma-plane.

16. The computer-implemented method of claim 10, further comprising:
  highlighting a representation of said complex parameter, sigma, within a predetermined distance to a parabola $\sigma_I^2 - \sigma_R - 1/4 = 0$ on a complex sigma-plane, using said computerized device.

17. The computer-implemented method according to claim 10, using said representation of said complex parameter, sigma, on a two-dimensional chart to provide assessment of proximity to voltage collapse in said electrical power network.

* * * * *